United States Patent Office 2,776,990
Patented Jan. 8, 1957

2,776,990

SEPARATION OF A DIBASIC ACID FROM A MIXTURE OF MONO AND DIBASIC ACIDS

Roger A. Hines, Wilmington, Del., assignor to E. I. du Pont de Nemours and Company, Wilmington, Del., a corporation of Delaware No Drawing. Application January 26, 1953,
Serial No. 333,373

4 Claims. (Cl. 260—537)

This invention relates to a process for the separation of pure dibasic acids from a mixture containing a plurality of those acids and more particularly is directed to the separation of succinic, glutaric and adipic acids from each other and from a mixture of monobasic and polybasic acids containing them.

The production of pure dibasic acids by oxidation of cycloparaffins is of considerable commercial importance at the present time because of the extensive use of such acids in the preparation of polyamide resins and because of the ready availability of cyclic hydrocarbons as starting materials from which the acids can be made. The Hamblet et al. U. S. Patent 2,557,282, issued June 19, 1951, describes the direct oxidation of cyclanes to a variety of products including, inter alia, monobasic and dibasic acids. From the crude mixture of oxidation products of the patent and of other like disclosures, separation of a single dibasic acid in a satisfactory degree of purity is difficult, yields of any single acid being quite low. The aforesaid inventors have shown that yields of acids can be remarkably improved if the oxidation is carried out in stages, in one of which a cycloparaffin is air oxidized to the corresponding cyclic alcohols and ketones and in another stage the mixture of alcohols and ketones is nitric acid oxidized to a mixture of corresponding dibasic acids. In that mixture, however, due to the heterogeneous nature of the oxidation products, there are a number of other more or less undesirable monobasic and dibasic acids. The complete separation of the dibasic acids in pure form from the oxidation product is difficult to accomplish by simple crystallization. As a consequence, large quantities of valuable acids found in the mixture have, in the past, been lost because of the lack of an economically satisfactory method by which to recover them.

An object of the present invention is to provide a process for the essentially complete separation of dibasic acids from a solution containing mono- and dibasic acids. Yet another object is to provide a process for the crystallization of adipic acid from a mixture of dibasic acids that contains succinic and glutaric acids. A further object is to provide a process for separating succinic, glutaric and adipic acids from a solution containing those acids obtained by the air oxidation, followed by the nitric acid oxidation of the cycloalkanes. Other objects and advantages of the invention will hereinafter appear.

The invention of the instant case is directed more particularly to the mixture of monobasic and dibasic acids left as a residue after the separation, by simple crystallization, of the major part of the adipic acid from the oxidation products of the cycloalkanes described in the Hamblet et al patent supra. In accord with the process of that patent, cycloparaffins are first air oxidized and the products of the air oxidation nitric acid oxidized to give a mixture of monobasic and dibasic acids in aqueous nitric acid solution. Adipic acid is separated from this mixture of acids by crystallization to leave a dilute aqueous nitric acid (up to 15% nitric acid) mother liquor containing succinic, glutaric and adipic acids together with some monobasic and other dibasic acids. Adipic acid cannot further be crystallized successfully from this mixture of acids because the succinic acid crystallizes simultaneously with the crystallization of adipic acid. In accord with the process of the invention, succinic and glutaric acid-free adipic acid can be separated in excellent yields from this and like concentrated mixtures of acids dissolved in water or aqueous nitric acid.

Concentrated solutions of adipic acid with succinic and/or glutaric acids are treated in accord with the invention with a base to neutralize partially the succinic acid present, i. e., a sufficient amount of a base is added to neutralize all mineral and monobasic organic acids present and in addition from 40 to 75% of the carboxyl groups of the succinic acid present in the mixture. This neutralization is preferably conducted at a temperature such that all of the compounds present in the partially neutralized mixture are in solution. A temperature between 60 and 90° C. is usually adequate to dissolve all the acids and salts present in this partially neutralized mixture. To obtain pure crystals of adipic acid it is essential that the next step of the process is conducted from a solution of the compounds. In the next step, the partially neutralized solution is cooled to a temperature at which the adipic acid will preferentially crystallize subsantially free from the glutaric and succinic acids. As the concentration of these acids is reduced the crystallization temperature can be lowered to 20° C. or below, as the concentration of these acids is increased the temperature of crystallization should be raised to about 50° C. The determining factor in each case is the co-crystallization temperature of the solution, i. e., the temperature at which crystals of compounds other than the crystals of the desired compound begin to form. The separation of pure crystals necessitates operation of the crystallization step above said co-crystallization temperature.

We believe that this invention utilizes the difference in hydrogen ion concentrations of the acids and the difference in solubility products to accomplish the separation. Since both succinic acid ($K_1 = 6.8 \times 10^{-5}$) and glutaric acid ($K_1 = 4.7 \times 10^{-5}$) are stronger acids than adipic acid ($K_1 = 3.6 \times 10^{-5}$) and in addition are also more water soluble (succinic acid, 6.9 g./100 g. $H_2O$, 20° C.; glutaric acid, 83.0 g./100 g. $H_2O$, 20° C.; adipic acid, 1.44 g./100 $H_2O$, 15° C.) a favorable equilibrium situation results on partial neutralization with a suitable base whereby the soluble acid succinate and acid glutarate will remain in solution while the adipic acid can be crystallized out.

In accord with another feature of the invention, the succinic acid can be separated from the glutaric acid present in the mother liquor from the aforesaid adipic acid crystallization step by acidification of the mother liquor filtrate to set free the succinic acid present from its monobasic salt, whereby the succinic acid and any remaining adipic acid are precipitated, leaving glutaric acid in solution. The precipitated succinic and adipic acid mixture is then filtered from the solution and subjected to crystallization for the recovery of the succinic acid down to the co-crystallization point of the adipic and succinic acids. The remaining mother liquor can be returned to the alkaline crystallization step for recovery of more of the adipic acid. Thus a remarkably clean recovery of adipic, succinic and glutaric acids can be made from the heterogeneous mixture of mono and dibasic acids obtained from the air and nitric acid oxidation of the cycloalkanes and from similar mixtures of these acids.

The table which follows illustrates embodiments of the invention in which parts are by weight unless otherwise indicated.

Table

| Ex. | Acids Used | Base | Quantity of Base | Percent Conv. to Mono-Succinate | Neut. Temp., °C. | Vol. H₂O, cc. | Cryst. Temp., degrees | Recovered wt. of Acid | Capillary M. P. | N. E. | Percent Succinic Acid | Percent Recovery of "Pure" Adipic [1] |
|---|---|---|---|---|---|---|---|---|---|---|---|---|
| 1 | 50 g. adipic acid / 50 g. succinic acid | Conc. aq. NH₄OH. | 30.0 cc | 105 | 65 | 45 | 28 | 27.8 g | 149–151° | 72.7 | 0.41 | 55.7 |
| 2 | 50 g. adipic acid / 50 g. succinic acid | Conc. aq. NH₄OH. | 30.0 cc | 105 | 80 | 30 | 29 | 36.1 g | 148–151° | 72.3 | 0.34 | 72.2 |
| 3 | 35 g. adipic acid / 70 g. succinic acid | Conc. aq. NH₄OH. | 42.0 cc | 105 | 80 | 10 | 31 | (12.1 g.) Spilled. | 149–152° | 72.8 | 1.3 | 34.6 |
| 4 | 50 g. adipic acid / 50 g. succinic acid | None | | | 85 | 60 | 30 | 85.1 g | 135–168° | 65.9 | (50.8)[2] | None |
| 5 | 30 g. adipic acid / 30 g. succinic acid / 35 g. glutaric acid / 5 g. NH₄NO₃ | Conc. aq. NH₄OH. | 17.5 cc | 102 | 80 | 18.5 | 29 | 17.7 g | 147–150° | 74.0 | | 59.0 |
| 6 | 30 g. adipic acid / 30 g. succinic acid / 35 g. glutaric acid / 5 g. NH₄NO₃ | Conc. aq. NH₄OH. | 21.5 cc | 126 | 85 | 9.5 | 30 | 17.9 g | 149–151° | 72.9 | 0.89 | 59.6 |
| 7 | 30 g. adipic acid / 30 g. succinic acid / 35 g. glutaric acid / 5 g. NaNO₃ | NaOH | 12.8 g | 156 | 60 | 40 | 28 | 17.8 g | 149–152° | 72.6 | 0.43 | 59.4 |
| 8 | 30 g. adipic acid / 30 g. succinic acid / 35 g. glutaric acid / 5 g. NaNO₃ | None | | | 65 | 70 | 31 | 33.2 g | | 67.1 | (42.8)[2] | None |
| 9 | 35 g. adipic acid / 70 g. succinic acid | NaOH | 19.0 g | 80 | 95 | 80 | 30 | 17.4 g | 148–150° | 72.6 | 3.35 | 49.7 |
| 10 | 35 g. adipic acid / 70 g. succinic acid | NaOH | 21.4 g | 90 | 90 | 80 | 30 | 17.2 g | 149.0–150.5° | 73.1 | 0.0 | 49.2 |
| 11 | 35 g. adipic acid / 70 g. succinic acid | NaOH | 26.1 g | 110 | 87 | 80 | 30 | | 130–138° part; 174–186° remainder. | 83.5 | Na-salt present. | None |
| 12 | 35 g. adipic acid / 70 g. succinic acid | NaOH | 23.7 g | 100 | 87 | 80 | 30 | 15.6 g | 148.5–150.5° | 73.1 | 0.0 | 44.6 |
| 13 | 35 g. adipic acid / 70 g. succinic acid | NaOH | 23.7 g | 100 | 92 | 80 | 25 | | 134–140° | 78.3 | Na-salt present. | None |

[1] Not corrected for trace of succinic acid in the adipic acid.
[2] Estimated from neutral equivalent.

The table shows, by comparison of Examples 1 and 2 with Example 4, that without partial neutralization no recovery of pure adipic acid results from crystallization of a 50/50 mixture of adipic and succinic acids. In Example 1, 55.7% of pure adipic acid was obtained and in Example 2, 72.2% of the pure acid was obtained. Example 3 illustrates that pure adipic acid can be recovered by the process of the invention from a solution containing twice as much succinic acid as adipic acid. In Examples 5 and 6 ammonium hydroxide is used to neutralize partially the acids in the mixture shown while in Example 7 sodium hydroxide is used for that purpose. By these bases, better than 59% recovery of pure adipic acid was realized. In Example 8, on the other hand, in which no base was used, no pure acid was recovered. Examples 11 and 13 illustrate the necessity of maintaining the temperature prior to crystallization above the temperature at which the sodium salts present crystallize out.

From the examples it is apparent that by proceeding in accord with their teachings and with the other teachings of the invention, it is possible to recover by crystallization the dibasic acids, succinic, glutaric and adipic acids, from mixtures of these acids. While the examples illustrate specific mixtures of these acids, the process of the invention is applicable to separating the acids from mixtures containing them in the presence or absence of other monobasic and dibasic acids. The invention is particularly for use with those mixtures from which a major amount of adipic acid has been recovered by simple crystallization prior to partial neutralization. Generally speaking, the invention is applicable to mixtures of monobasic and dibasic acids in which dibasic acids, such as succinic, glutaric and adipic, are present in such proportions that the adipic acid cannot be separated by simple crystallization. More particularly the process is directed to the recovery of pure adipic acid from mixtures, slurries or solutions that contain two to three times as much succinic acid as adipic acid in the presence or absence of other mono- or dibasic acids.

While any suitable base may be used for neutralizing the inorganic and monobasic acids that may be present and a portion of the succinic acid, ammonia and ammonium hydroxide are preferred although other bases may be used, such, for example, as the hydroxides of the alkali metals and alkaline earth metals as well as their carbonates and bicarbonates.

While the process has been described for the separation more particularly of adipic acid from a mixture of that acid with succinic and glutaric acids and succinic acid from the mother liquor therefrom, it is likewise applicable to the separation by crystallization of adipic acid from mixtures of this acid containing monobasic and mineral acids and succinic acid from that mother liquor. The stronger acids are partially neutralized in the manner described above for the partial neutralization of succinic and mineral acids in a mixture of those acids with adipic acid and the adipic acid then separated from the partially neutralized stronger acids by simple crystallization, the succinic acid then recovered from the mother liquor by the alternate process.

I claim:

1. In a process for the crystallization of adipic acid from the nitric acid mother liquor obtained by crystallizing adipic acid from the mixture of monobasic acids and dibasic acids obtained by the air and nitric acid oxidation of cyclic alkanes, said mother liquor containing a higher concentration of succinic acid than adipic acid, the step which comprises adding a sufficient amount of ammonia to the mother liquor to neutralize the nitric acid and monobasic acids present and from 40 to 75% of the carboxyl groups of the succinic acid present but insufficient to precipitate ammonium salts during subsequent crystallization, and thereafter crystallizing the adipic acid from a temperature at which all the acids and salts present are in solution in the mother liquor.

2. A process for the recovery of adipic acid from a solution thereof containing monobasic and dibasic organic acids, which comprises adding ammonia to an aqueous solution containing nitric acid, monobasic and dibasic organic acids, including succinic and adipic acids, there being present a higher concentration of succinic acid than adipic acid, the ammonia being added in sufficient amounts to neutralize all of the nitric and monobasic acids and from 40 to 75% of the carboxyl groups of the succinic acid but insufficient to precipitate ammonium salts during subsequent crystallization, and thereafter crystallizing pure adipic acid from the solution by lowering the temperature of the solution from a temperature at which all of the acids and salts are dissolved in the solution.

3. A process for the recovery of adipic acid from a nitric acid mother liquor containing monobasic and dibasic acids, such as succinic acid, the mother liquor being left as a residue after the separation by simple crystallization of the major part of the adipic acid from a mixture of the oxidation products of the air oxidation of cycloparaffins followed by the nitric acid oxidation of the air oxidation products, which comprises adding ammonia to the mother liquor in sufficient amounts to neutralize all of the nitric acid and monobasic acids present and from 40 to 75 percent of the carboxyl groups of the succinic acid present, which amount is insufficient to precipitate any salts from solution during subsequent crystallization of the adipic acid, and at a temperature between 60 and 90° C., crystallizing adipic acid from the partially neutralized mixture of acids by lowering the temperature, the crystallization temperature being maintained below the neutralization temperature but above the temperature at which crystallization of the monobasic salts of adipic acid and succinic acid occurs.

4. The process in accord with claim 3 in which the mother liquor, after separation of the adipic acid crystals from the partially neutralized mixture of acids, is acidified and succinic and adipic acid crystals separated therefrom by crystallization.

References Cited in the file of this patent

UNITED STATES PATENTS

| | | |
|---|---|---|
| 1,822,016 | Daniels | Sept. 8, 1931 |
| 1,942,826 | Mills | Jan. 9, 1934 |
| 1,945,246 | Witzel | Jan. 30, 1934 |
| 2,323,061 | Lehmann | June 29, 1943 |
| 2,557,282 | Hamblet et al. | June 19, 1951 |
| 2,713,067 | Hamblet et al. | July 12, 1955 |